US00RE48596E

(19) United States
(12) Reissued Patent
Simister et al.

(10) Patent Number: US RE48,596 E
(45) Date of Reissued Patent: Jun. 15, 2021

(54) INTERFACE ENGINE PROVIDING A CONTINUOUS USER INTERFACE

(71) Applicant: Intel Corporation, Santa Clara, CA (US)

(72) Inventors: James Bret Simister, San Francisco, CA (US); Adam G. Wolff, San Francisco, CA (US); Max David Carlson, San Francisco, CA (US); Christopher Kimm, San Francisco, CA (US); David T. Temkin, San Francisco, CA (US)

(73) Assignee: Intel Corporation, Santa Clara, CA (US)

(21) Appl. No.: 16/776,438

(22) Filed: Jan. 29, 2020

Related U.S. Patent Documents

Reissue of:
(64) Patent No.: 7,954,066
Issued: Mar. 31, 2011
Appl. No.: 11/178,222
Filed: Jul. 8, 2005

U.S. Applications:
(63) Continuation of application No. 13/907,321, filed on May 31, 2013, now abandoned, which is an (Continued)

(51) Int. Cl.
*G06K 15/00* (2006.01)
*G06F 3/0481* (2013.01)
*G06F 8/38* (2018.01)

(52) U.S. Cl.
CPC ..... *G06F 3/0481* (2013.01); *G06F 8/38* (2013.01)

(58) Field of Classification Search
CPC ..... G06F 3/0481; G06F 8/38
(Continued)

(56) References Cited

U.S. PATENT DOCUMENTS 5,481,665 A 1/1996 Okada
5,533,183 A * 7/1996 Henderson et al. ..... 715/854
(Continued)

*Primary Examiner* — Dennis G Bonshock
(74) *Attorney, Agent, or Firm* — Hanley, Flight & Zimmerman

(57) ABSTRACT

An interface engine provides animated views in a user interface. The interface engine directs the operation of a rendering environment to create an interface in a rendering area. The interface engine includes views, layouts, animators, and constraints. Views identify child views and resources for display in the rendering area. In response to events, such as user inputs, a view modifies itself by calling layouts, animators, and constraints. A layout manages the attributes of a view's child views, including child view position and size. An animator modifies the view's appearance over a specified period of time. A constraint imposes limits on view properties. In one implementation, an Internet site delivers an interface engine to a browser to supply content and a user interface. A presentation server compiles an interface engine description and specified resources into an interface engine. The presentation server delivers the interface engine to the browser, which executes the interface engine using a plug-in—eliminating excessive interface updates found in traditional HTML pages.

44 Claims, 13 Drawing Sheets

Related U.S. Application Data application for the reissue of Pat. No. 7,954,066, which is a continuation of application No. 10/092,360, filed on Mar. 5, 2002, now Pat. No. 6,957,392.

(60) Provisional application No. 60/034,671, filed on Jan. 16, 2002.

(58) Field of Classification Search
USPC ..... 715/798, 746
See application file for complete search history.

(56) References Cited

U.S. PATENT DOCUMENTS

| | | | | |
|---|---|---|---|---|
| 5,546,943 | A | 8/1996 | Gould | |
| 5,555,368 | A | 9/1996 | Orton | |
| 5,682,469 | A | 10/1997 | Linnett | |
| 5,764,226 | A | 6/1998 | Consolatti | |
| 5,867,166 | A | 2/1999 | Myhrvold | |
| 5,995,102 | A * | 11/1999 | Rosen et al. | 715/856 |
| 6,057,834 | A * | 5/2000 | Pickover | 715/846 |
| 6,065,057 | A * | 5/2000 | Rosen et al. | 709/229 |
| 6,111,578 | A | 8/2000 | Tesler | |
| 6,124,864 | A | 9/2000 | Madden | |
| 6,179,713 | B1 * | 1/2001 | James et al. | 463/42 |
| 6,308,208 | B1 * | 10/2001 | Jung et al. | 709/224 |
| 6,377,281 | B1 | 4/2002 | Rosenbluth | |
| 6,388,665 | B1 | 5/2002 | Linnett | |
| 6,448,980 | B1 | 9/2002 | Kumar | |
| 6,496,842 | B1 | 12/2002 | Lyness | |
| 6,509,898 | B2 * | 1/2003 | Chi et al. | 345/440 |
| 6,563,503 | B1 | 5/2003 | Comair | |
| 6,611,268 | B1 * | 8/2003 | Szeliski et al. | 345/473 |
| 6,626,954 | B1 * | 9/2003 | Kamachi et al. | 715/236 |
| 6,630,943 | B1 | 10/2003 | Nason | |
| 6,636,220 | B1 * | 10/2003 | Szeliski et al. | 345/475 |
| 6,727,915 | B2 | 4/2004 | Coleman | |
| 6,732,170 | B2 * | 5/2004 | Miyake et al. | 709/223 |
| 6,751,620 | B2 * | 6/2004 | Orbanes et al. | 707/10 |
| 6,766,299 | B1 * | 7/2004 | Bellomo et al. | 704/276 |
| 6,785,667 | B2 * | 8/2004 | Orbanes et al. | G06F 3/0346 |
| 6,795,663 | B2 * | 9/2004 | Kato | 399/81 |
| 6,854,120 | B1 * | 2/2005 | Lo et al. | 719/311 |
| 6,957,392 | B2 * | 10/2005 | Simister et al. | 715/746 |
| 2002/0070978 | A1 * | 6/2002 | Wishoff | G06F 8/38 715/811 |
| 2002/0089530 | A1 * | 7/2002 | Markel | H04N 21/854 715/719 |

* cited by examiner

INTERFACE ENGINE PROVIDING A CONTINUOUS USER INTERFACE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

*More than one reissue application has been filed for the reissue of U.S. Pat. No. 7,954,066.* This application is *an application for reissue of U.S. Patent No. 7,954,066, entitled "Interface Engine Providing a Continuous User Interface," issued May 31, 2011, and is a continuation of U.S. patent application Ser. No. 13/907,321, entitled "Interface Engine Providing a Continuous User Interface," filed May 31, 2013, which is an application for reissue of U.S. Pat. No. 7,954,066, entitled "Interface Engine Providing a Continuous User Interface," issued May 31, 2011, which was* a continuation application of U.S. patent application Ser. No. 10/092,360, entitled "Interface Engine Providing a Continuous User Interface," filed Mar. 5, 2002 now U.S. Pat. No. 6,957,392, incorporated herein by reference, which claims the benefit of U.S. Provisional Application No. 60/349,671, entitled "Interactive System," filed Jan. 16, 2002, incorporated herein by reference.

CROSS-REFERENCE TO RELATED APPLICATIONS

This Application is related to U.S. patent application titled "Presentation Server," by Eric D. Bloch, Max David Carlson, Christopher Kimm, J. Bret Simister, Oliver W. teele, David T. Temkin and Adam G. Wolff, filed on the same day as the present application and incorporated herein by reference.

BACKGROUND OF THE INVENTION

1. Field of the Invention

The present invention is directed to interfaces for computer systems.

2. Description of the Related Art

Graphical user interfaces have become heavily integrated in many aspects of people's lives. People constantly interact with these interfaces in their every day business and pleasure activities. Example interfaces include computer operating systems and applications, Internet sites, personal digital assistants, and cellular telephones.

Graphical interfaces should provide users with a continuous interactive experience, much like people experience in their everyday interactions with other people and physical objects. People experience a physical object's characteristics smoothly transitioning from one state to the next through a continuum of intermediate states. When a spring is compressed, a person sees the fluid transitions the spring makes from the decompressed state to the compressed state. People's physical world experiences also lead them to expect that changes in one object can interrupt and alter the state of another object. This is seen when a baseball bat breaks while striking a ball—causing the ball to change its position and the bat to alter it's form and position through a fluid continuum of adjustments.

Traditional user interfaces, however, provide users with discrete displays that transition from one predefined state to another—failing to show any display states between the beginning state and end state. If a user calls for the size of a displayed icon to be expanded, traditional interfaces only display the fully expanded icon without showing a gradual progression of the icon's dimension changes. Additionally, the icon's instantaneous transition cannot respond to a user's efforts to interrupt or reverse the operation. This is not how people interact with their surroundings. Imagine if the above-mention spring transitioned from decompressed to fully compressed without having any intermediate states.

A user's interface to an Internet site through a network browser is one of the least continuous interfaces. Traditional browsers receive network content in descriptive HTML pages. Browsers alter HTML page displays by making network requests for updated HTML pages. This results in significant periods of time elapsing between display updates—prohibiting Internet sites from delivering display updates in a continuous fashion.

The ability to deliver a continuous user interface is seriously hampered by the lack of suitable interface development tools. Traditional development tools only allow developers to employ predefined displays that sharply transition between discrete states. The predefined displays are based on prewritten scripts for each display that developers cannot control. Individual pre-coded components of a system may exhibit some continuous behavior, but this is limited to these components and not supported as a framework for the entire system. In some instances, a developer writes a custom script to provide a more continuous interface for a display, but the developer's efforts are limited solely to that one display—making the developer's scripting of a complete continuous interface with many displays too difficult and expensive to achieve.

SUMMARY OF THE INVENTION

The present invention, roughly described, provides for effectively implementing a continuous user interface. In one implementation, the interface provides a user with displays that transition fluidly, interact seamlessly with other on-screen displays, and respond in real time to user input interruptions.

In one example, the interface provides a window that alters its properties in response to another window's properties changing. The windows can each alter different properties, such as one window changing position in response to the other window expanding. The windows'respective transitions occur in fluid motion that brings the transitions to life for the user. The interface allows a user to interact via mouse or keyboard to reverse either window transition in midstream. The interface projects the fluid transitions of the interrupted window in response to the user's input, so the user feels like he or she is interacting with a real world object.

Underlying the user interface is an interface engine with a modular architecture crafted to support continuous user interfaces. The interface engine is constructed from a framework of modular control elements that drive interface operation. Developers create an interface by selecting control elements and specifying the desired display operations, instead of scripting custom code to control each display operation. The selected control elements are responsible for generating display transitions that are fluid, interruptible, and adaptable based on the operation parameters a developer provides.

In one implementation, the framework of modular control elements includes views and attribute modifiers. Views are responsible for displaying visual interface graphics. Each view is capable of supporting child views and resources, such as graphical window displays and media content and more basic components such as buttons and graphical objects. In response to system events, such as user inputs, a view modifies itself using a set of attribute modifiers that are available to all of the views.

One set of attribute modifiers includes layouts, animators, and constraints. A layout manages the attributes of a view's child views, including child view position and size. An animator modifies a view's appearance over a specified period of time. A constraint imposes limits on a view attribute in response to a detected event, such as the modification of another view attribute. For example, one view may constrain itself to being centered within another view—making the display transitions of the views interrelated.

An example view provides a planning program interface with a main view that contains child views for a calendar and contacts list. A user clicks an on-screen button with a mouse to prompt changes in the planning program's interface. In response to the user input, the main view calls a layout to rearrange the positions of the calendar and contacts list. The main view, calendar, and contacts list each call respective animators and constraints to make specified appearance adjustments. The called layouts, animators, and constraints drive the interface platform to display the appearance and arrangement transitions as fluid continuums.

Developers can employ the above-described views and attribute modifiers to create an endless number of engines for driving continuous interfaces. In one instance, developers are provided with existing views, layouts, animators, and constraints to fit together when building an interface. In other instances, developers are also allowed to create custom views that call the provided layouts, animators, and constraints—enabling developers to build a highly customized interface without scripting individual display transitions. Additionally, a developer's custom views can work in concert with other views provided by a system or created by other developers.

A developer's interface engine description is compiled into an operating interface engine and delivered to a rendering platform, such as a computer system. In one implementation, an Internet site delivers an interface engine to a browser plug-in instead of providing only descriptive HTML pages—enabling the browser's users to access network resources in a continuous interface environment.

Internet site designers and desktop application designers are only two examples of developers that benefit from the ability to construct modular interface engines. The benefits of easily providing continuous user interfaces is not limited to the Internet and desktop applications identified above. The modular interface engine architecture has applicability to any user interface environment. For example, video game systems and simulation systems could be greatly enhanced in further embodiments of the present invention.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

DETAILED DESCRIPTION

Figure 1:
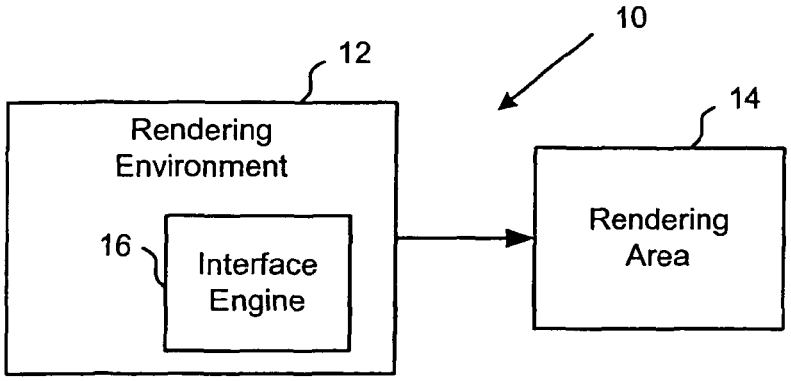
FIG. 1 depicts a block diagram of a system providing a continuous user interface in accordance with the present invention.

FIG. 1 shows a system 10 for providing a continuous user interface in accordance with the present invention. Rendering environment 12 renders resources in system 10 and delivers the rendered resources to rendering area 14 for display—providing an interface for users of system 10. Interface engine 16 directs the rendering of resources by rendering environment 12. Resources are graphical elements, including vector graphics, bitmaps, and streaming media. One example of rendering environment 12 is the Flash Player from Macromedia. Those skilled in the art recognize that alternate embodiments of system 10 employ other rendering environments.

As will be explained below, interface engine 10 has a novel modular architecture that enables system 10 to deliver a continuous interface that responds to user inputs in real time. In one embodiment, system 10 shows users the continuous animation of resources in rendering area 14, instead of showing only discrete snap shots of different resource displays. For example, a user sees the opening of a window unfold over time, instead of immediately seeing a fully opened window.

The power of a continuous user interface is also illustrated by a user's ability to interrupt and change the course of resource animations, with the result being a smooth transition in the resource display. For example, while a resource display is being animated to expand in rendering area 14, a user command can interrupt the expansion to begin an alternate animation, such as a constriction. System 10 shows the user the continuous cumulative affect of the expansion animation and constriction animation—differing significantly from traditional interfaces that would only show a discrete snapshot of the expanded resource and a discrete snapshot of the constricted resource.

In one implementation, a unique set of building blocks provides a framework for developers to utilize in creating interface engine 16. As will be explained in greater detail below, this framework allows developers to employ objects that drive the smooth transition of resource states—eliminating the need for developers to write separate customized scripts for displaying each resource. The framework's building blocks can be utilized for displaying many different resources—allowing developers to create continuous display transitions by merely specifying beginning display conditions, desired ending display conditions, and the transition duration. The building blocks offload the user from constructing low level scripts to carry out resource animation and layouts.

Figure 2A:
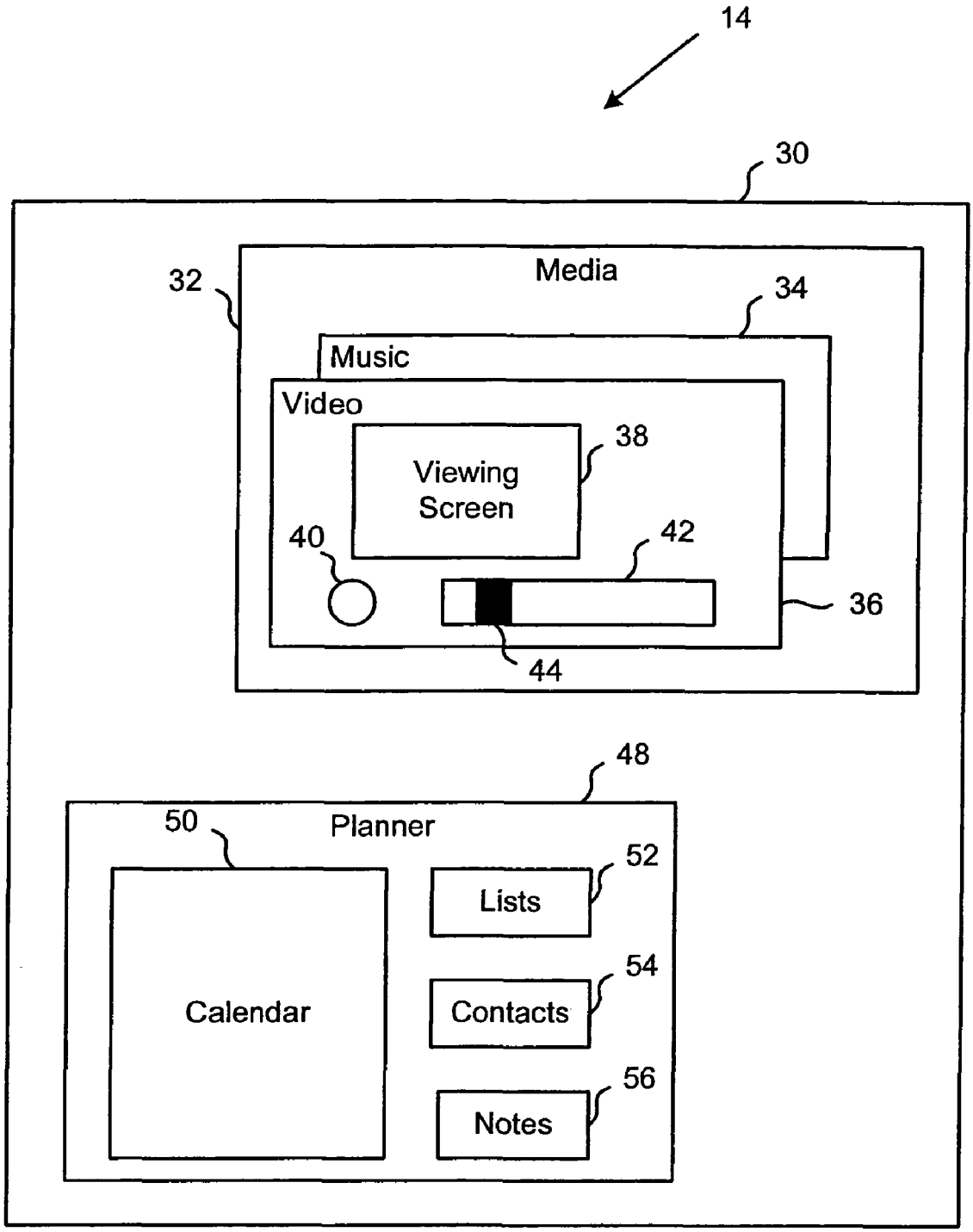
FIGS. 2A and 2B show a rendering area with an interface driven by an interface engine in accordance with the present invention.

FIG. 2A depicts an example interface displayed on rendering area 14. Resource 30 is a canvas providing a graphical backdrop for Media resource 32 and Planner resource 48, which provide graphical backdrops for their respective child resources. Rendering area 14 displays Calendar resource 50, Lists resource 52, Contacts resource 54, and Notes resource 56 within Planner resource 48. Calendar resource 50 displays a calendar for a selected month. Lists resource 52 shows a list of action items. Contacts resource 54 displays a listing of contact information for different individuals and entities. Notes resource 56 displays a user's personal notes.

Rendering area 14 displays Music resource 34 and Video resource 36 inside Media resource 32. Music resource 34 displays a set of graphics (not shown) related to selecting and playing music. Within Video resource 36, rendering area 14 displays resources for Viewing Screen 38, Slider 42, and Button 40. Viewing Screen resource 38 displays a selected video clip. Button resource 40 displays a button used to start and stop the video clip in Viewing Screen resource 38. Slider resource 42 displays a volume level indicator for the video clip in Viewing Screen resource 38. Inside Slider 42, rendering area 14 displays Slide Button resource 44, which allows a user to set the video clip's volume.

Figure 3:
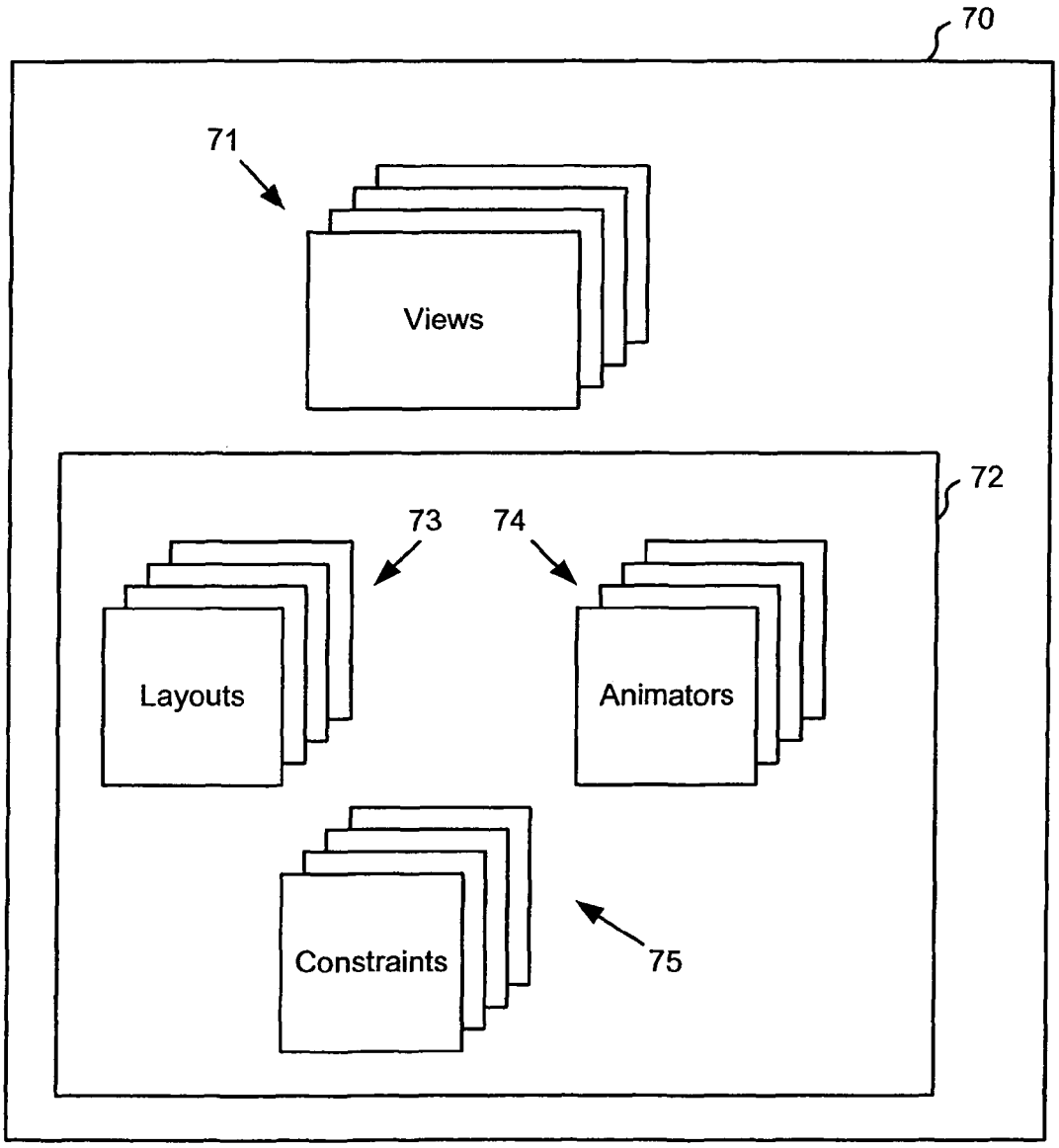
FIG. 3 shows a set of interface engine building blocks employed by a developer to implement an interface engine for providing a continuous user interface.

FIG. 3 shows one implementation of a building block framework developers can use to create a continuous interface engine that drives the interface shown in FIG. 2A. Building block set 70 includes view set 71 and attribute modifier set 72. FIG. 3 provides an overview of the relationship between views and attribute modifiers. More details regarding views and attribute modifiers are provided below with reference to later numbered figures.

Each view in view set 71 identifies one or more resources for displaying in a rendering area, such as the resources shown in FIG. 2A. Each view has a set of attributes, including a resource identifier, that define the view's operation. For example, attributes dictate the view's appearance, the conditions for altering the view's appearance, and the mechanism for altering the view's appearance. As a view's appearance changes, so does the display of its identified resource in rendering area 14. Another set of view attributes identifies child views that are associated with the view. For example, Media resource 32 and Planner resource 48 in FIG. 2A are driven by child views of the view driving Canvas resource 30.

A view calls attribute modifiers in set 72 to alter view attributes in response to events, such as a user input or an attribute change in the view or another view. For example, if a user issues a command to expand the display of a view's resource, the view calls an attribute modifier in set 72 to change appearance related attributes in the view. In another example, a view in rendering area 14 is expanded and this expansion signals a second view to shrink. The second view calls an attribute modifier to carry out the shrinking transition. In further embodiments, developers can design their own views for inclusion in view set 71.

In one embodiment, attribute modifier set 72 includes three types of attribute modifiers—layouts 73, animators 74, and constraints 75. Layout set 73 includes multiple layouts that can each be called by any of the views in set 71 to alter the view's child views. Animator set 74 includes multiple animators that can be called by any view in set 71 to animate the view's appearance. Constraint set 75 includes multiple constraints that can each be called by any of the views in set 71 to modify a view attribute in response to the state of another attribute changing. In a further embodiment, a view can call an attribute modifier to modify an attribute in another view. In one implementation, developers can design their own attribute modifiers for inclusion in set 72.

Framework 70 significantly benefits interface engine developers by eliminating the need for them to write scripts to perform attribute modification. Developers can employ the building blocks in framework 70 to define the operation of views at a high level—identifying the desired attribute modifiers, the magnitude of modification desired, and the modification time period. The views, in conjunction with the attribute modifiers, are fully responsible for implementing the specified modifications.

Figure 4A:
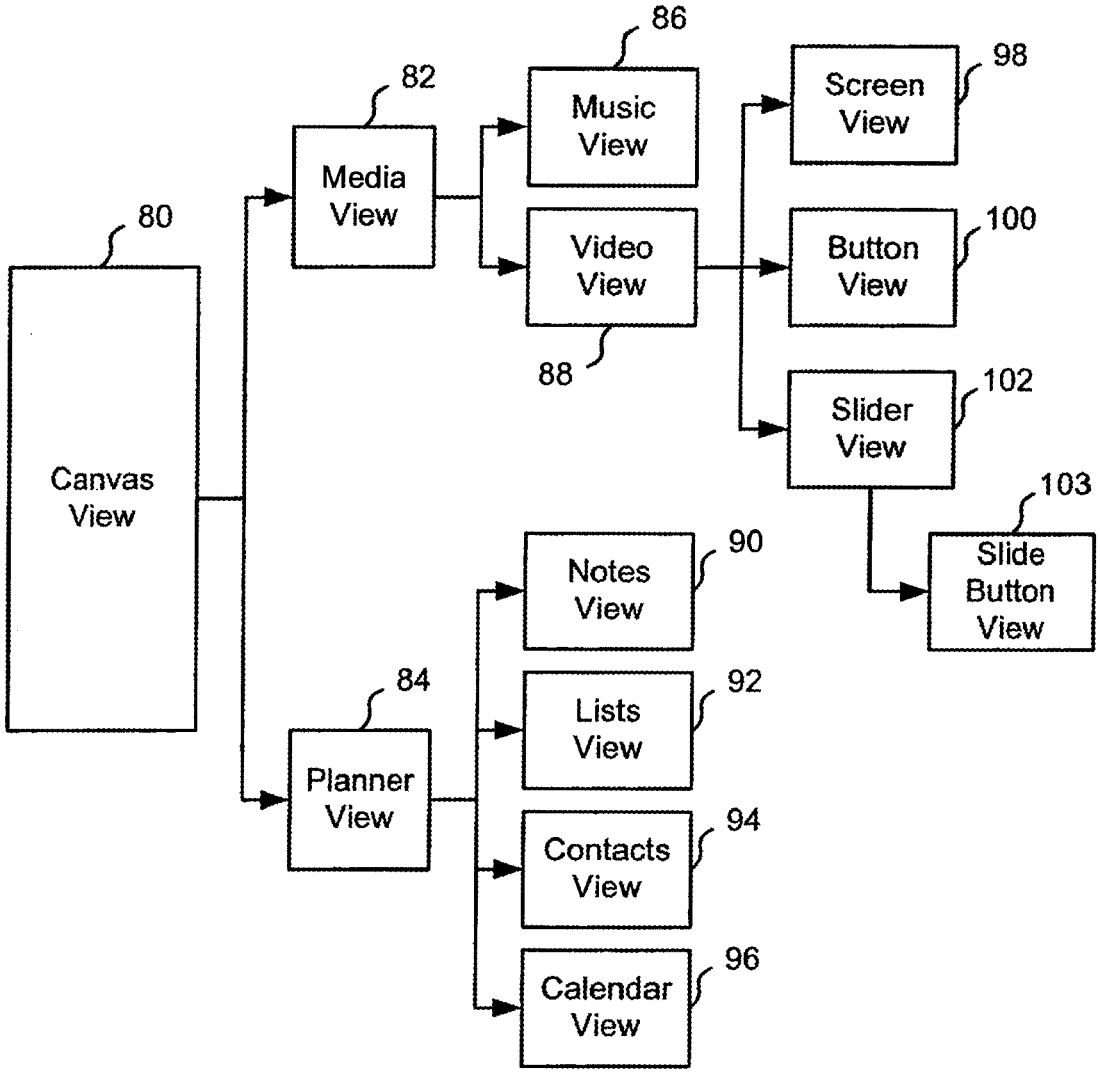
FIG. 4A shows an interface engine view structure for the interface displayed in the rendering area in FIGS. 2A and 2B.

FIG. 4A shows a view structure in one embodiment of interface engine 16 for generating the interface shown on rendering area 14 in FIG. 2A. Interface engine 16 is formed by a set of interrelated views that direct the operation of rendering environment 12. Each view identifies one or more resources for display in rendering area 14. Some views also identify one or more child views for display within rendering area 14.

Canvas view 80 identifies bitmap resource 30, which provides a background display for the interface shown in rendering area 14. Canvas view 80 also identifies two child views—Media view 82 and Planner view 84. Media view 82 and Planner view 84 identify Media resource 32 and Planner resource 48, respectively. Media view 82 identifies two child views, Music view 86 and Video view 88, that identify Music resource 34 and Video resource 36, respectively.

Video view 88 identifies 3 child views, Screen view 98, Button view 100, and Slider view 102. These child views identify Viewing Screen resource 38, Button resource 40, and Slider resource 42, respectively. Slider view 102 identifies child Slide Button view 103, which identifies Slide Button resource 44. Planner view 84 identifies four child views, Notes view 90, Lists view 92, Contacts view 94, and Calendar view 96—identifying Notes resource 56, Lists resource 52, Contacts resource 54, and Calendar resource 50, respectively.

FIG. 4A only shows one example of an interface engine view structure. Those skilled in the art recognize that interface engine 16 can employ many different views to create different interfaces.

Figure 4B:
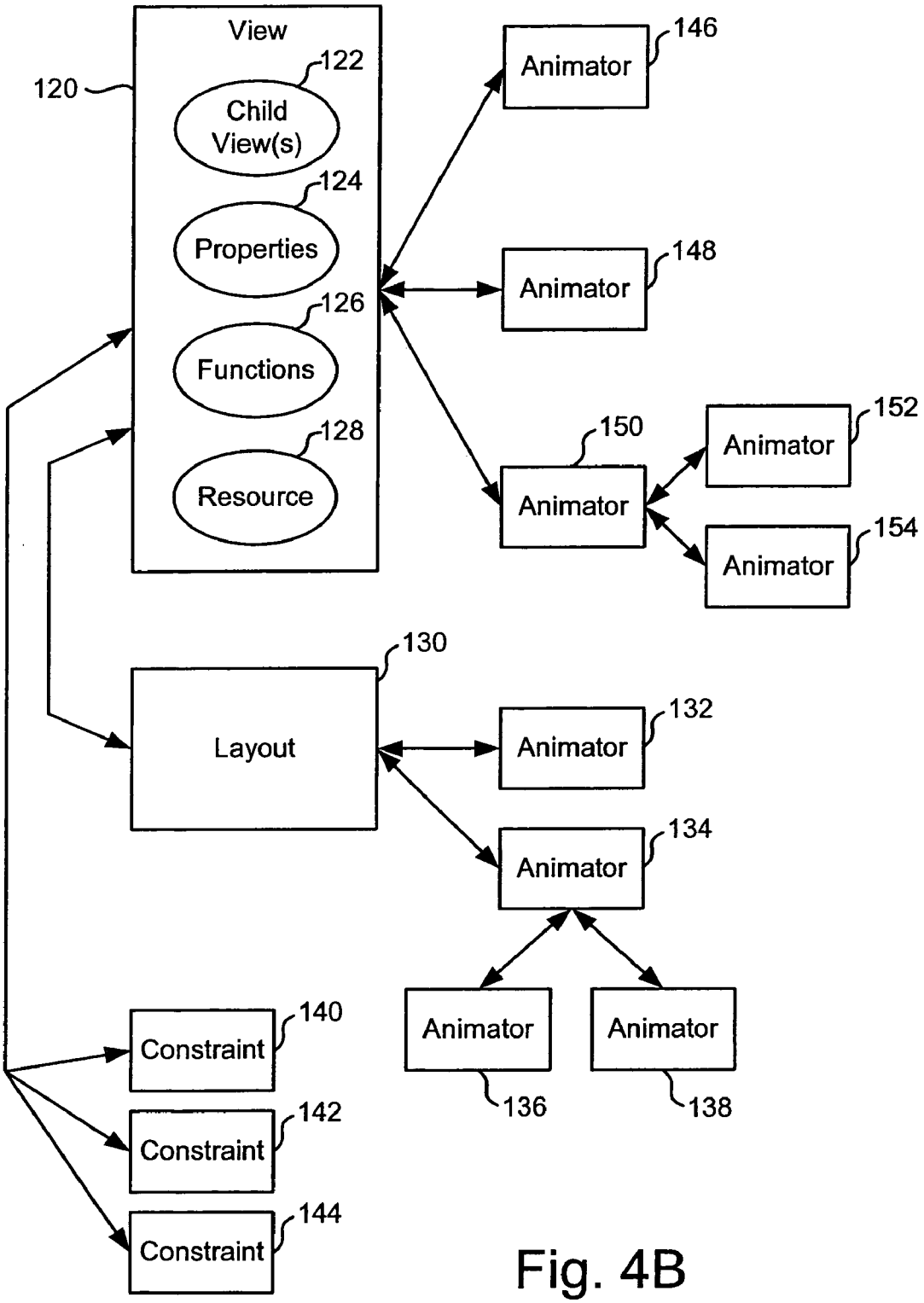
FIG. 4B depicts a block diagram for one embodiment of an interface engine view.

FIG. 4B shows one embodiment of view 120 within interface engine 16, such as the views shown in FIG. 3. View 120 has a set of attributes, including child view set 122, property set 124, function set 126, and resource set 128. Property set 124 specifies properties that define the appearance of view 120. In one implementation, property set 124 includes properties for the view's rendering area position, height, width, rotation, and transparency.

In one embodiment, resource set 128 contains a single resource. In one implementation, view 120 provides a pointer to resource 128. In an alternate implementation, view 120 contains resource 128. In further embodiments, view 120 identifies multiple resources.

Child view set 122 identifies child views that are associated with view 120. In one implementation, view 120 names a set of child views that are to be displayed within view 120 in rendering area 14. In an alternate embodiment, the child views in set 122 do not need to be displayed entirely within view 120. The child views are allowed to extend outside view 120 without being clipped by view 120. Although view 120 is shown as identifying child views 122, a view is not required to identify child views.

Function set 126 contains functions that respond to events occurring within system 10, such as user inputs. Function set 126 includes a variety of functions for modifying view 120 and child views 122. Functions directly alter view attributes or call attribute modifiers within interface engine 16 to make attribute modifications. As explained above, the attribute modifiers reside outside of view 120, so other views in the interface engine can utilize the same attribute modifiers. This modular architecture facilitates interface engine 16 providing a continuous user interface. Greater details regarding this feature are explained below.

The attribute modifiers in interface engine 16 include layouts, animators, and constraints, as explained above with reference to FIG. 3. A layout modifies one or more attributes of a view's child views. In one embodiment, the child views are associated with the view calling the layout. In alternate embodiments, the child views are associated with a different view. In one example, a layout vertically aligns a view's child views. An animator animates a view property. In one implementation, interface engine 16 has animators for modifying view position, height, width, rotation, and transparency over a specified period of time. A constraint is called to modify an attribute of one view in response to the value of another attribute. In some instances, the attribute triggering the constraint is associated with a different view than the attribute being modified. An example constraint sets the position property of one child view with respect to the position of another child view. In one embodiment, the attribute modifiers of interface engine 16 employ floating point calculation to enhance graphical display quality. FIG. 4B and the above description only illustrate examples of the layouts, animators and constraints that can be included in embodiments of interface system 16. Those skilled in the art will recognize that many more are possible.

View 120 calls animators 146, 148, and 150 to modify properties in property set 124. View 120 calls layout 130 to modify the attributes of child views 122. View 120 calls constraints 140, 142, and 144 to set values for properties in property set 124 in response to changes in attributes in interface engine 16.

In one implementation of interface engine 16, layouts call animators. FIG. 4B shows layout 130 calling animators 132 and 134. In one example, a layout calls a set of animators to animate a layout change over a period of time. In another example, a layout calls a set of animators to determine property changes for a set of child views between an initial orientation and a final orientation. For instance, animators are useful for determining child view positions in non-linear layouts.

In a further implementation of interface engine 16, an animator calls other animators to modify view properties. This is illustrated in FIG. 4B, by animator 150 calling animators 152 and 154 and animator 134 calling animators 136 and 138. An example of an animator calling other animators arises when a view calls an animator to change the view's position in multiple dimensions. In this example, the primary animator calls one animator to make vertical position changes and another animator to make horizontal position changes. The primary animator provides the combined vertical and horizontal position changes to the view.

Figure 2B:
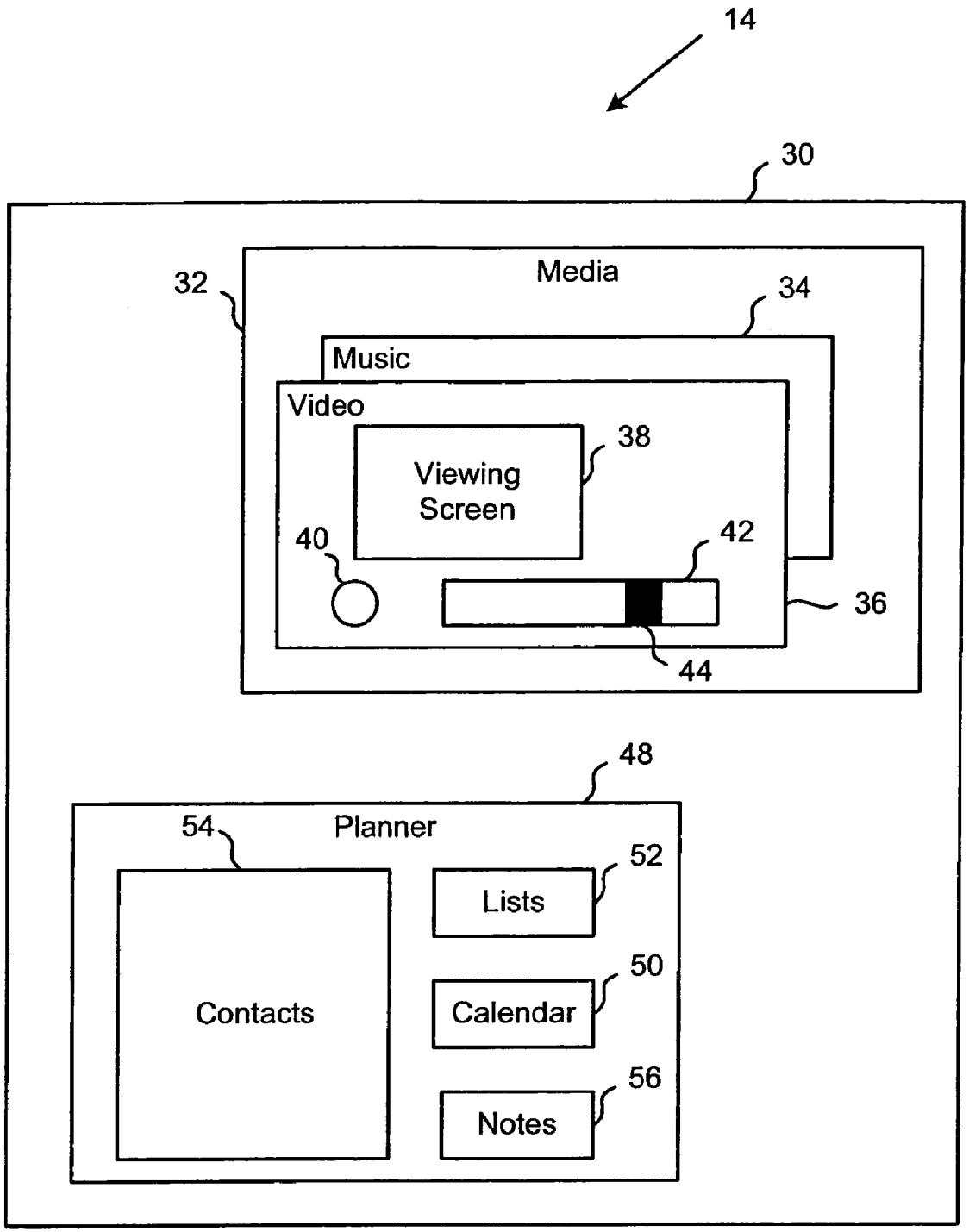

Interface engine 16 employs the view architecture shown in FIG. 4B to modify the interface shown in FIG. 2A to have the appearance shown in FIG. 2B. Interface engine 16 directs rendering environment 12 to move Slide Button resource 44, shrink and move Calendar resource 50, and expand and move Contacts resource 54.

Slide Button view 103 calls an animator (not shown) to move the position of Slide Button view 103 to the right. Calendar view 96 calls a set of animators (not shown) to shrink its height. Contacts view 94 calls a set of animators (not shown) to increase its height. Planner view 84 calls a layout (not shown) to rearrange the position of Calendar view 96 and Contacts view 94.

The actions taken by the above-referenced views to change the interface display on rendering area 14 are initiated by functions in the referenced views. For example, Slide Button view 103 has a function that responds to a user clicking on Slide Button resource 44 and moving it. Similarly, Planner view 84, Contacts view 94, and Calendar view 96 have functions that respond to a user calling for: (1) Calendar resource 50 to be shrunk, (2) Contacts resource 54 to be expanded, and (3) the positions of Contracts resource 54 and Calendar resource 50 to be exchanged. Greater details about the internal operations of views, layouts, and animators are provided below.

Figure 5:
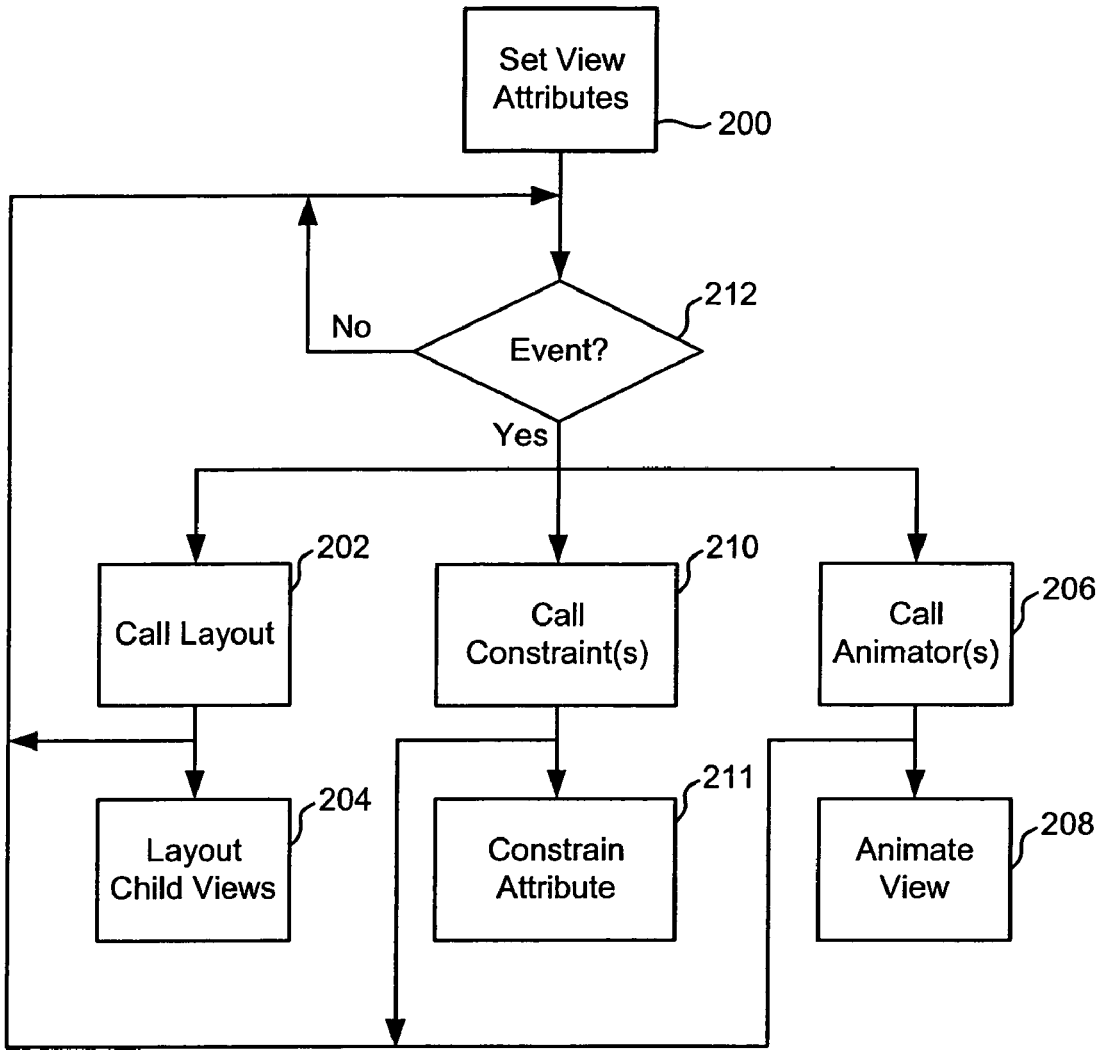
FIG. 5 illustrates one version of a sequence of operations carried out by an interface engine to change view attributes.

FIG. 5 shows a sequence of operations carried out by one embodiment of interface engine 16 for changing the attributes of view 120. View 120 initially executes functions to set view attributes (step 200). Example attribute settings include determining and setting view properties 124, adding child views 122, deleting child views 122, duplicating child views 122, attaching resource 128, unloading resource 128, setting constraints on view properties, and releasing constraints on view properties.

In one embodiment, the following property setting functions are available in view 120: (1) setProp—setting a desired value for a property; (2) getProp—identifying a current value for a property; (3) setPropRelative—setting a value for a property relative to a reference view; (4) getPropRelative—identifying a value for a property relative to a reference view; (5) setVisible—setting a view to be visible or hidden; (6) getMouse—identifying a position of a mouse cursor; (7) bringToFront—setting a child view to be the front most view within a set of child views; (8) setScale—setting a scale for a view's height or width; and (9) addToProp—adding a value to a property.

In setting a property constraint, view 120 identifies the constraint, a property to constrain, and an offset for the constraint to apply. In one embodiment, the offset limits a view's property relative to another view. For example, view 120 limits a child button view's position to be within a specified distance from the right edge of its parent view. In alternate embodiments, view 120 provides different parameters to the constraint. For example, view 120 may provide a parameter specifying the view to be constrained, if view 120 is not the constrained view.

After setting the attributes, view 120 responds to events (step 212). An event is an occurrence that causes view 120 to change an attribute value. One example of an event is a user input, such as clicking and moving a mouse. Another example is the changing value of an object's attribute in interface engine 16, such as an attribute change in a view. View 120 determines which layout, animator, or constraint to call in response to the event. In some instances, the view calls a combination of layouts, animators, and constraints. In one embodiment, view 120 calls an animator in response to a user input and calls a layout and/or constraint in response to an attribute value change.

The operation of view 120 is event driven. If no event occurs, view 120 maintains its current state (step 212). If an event is detected, view 120 calls the appropriate layout (step 202), constraint (step 212), animator (step 206), or a combination thereof. A called layout lays out child views 122 (step 204). Called animators animate view 120 (step 208). A called constraint sets a value for an attribute, such as a property. As part of the layout, animation, and constraint steps (steps 204, 208, and 211), view 120 receives new values for the view's attributes from the called layout, animators, and/or constraints. In one example, view 120 uses these attribute values to update the corresponding properties of the view's resource.

When view 120 calls a constraint (step 210), a function calls the constraint and identifies the property being constrained and an acceptable constraint offset, as described above for setting a constraint. When new attributes are not within a tolerable range, the constraint resets the attributes to acceptable values. Greater details regarding layouts and animators are provided below.

Although FIG. 5 shows step 212 being repeated after layout call step 202, animate call step 206, and constraint call step 210, the event determination (step 212) is not delayed until all animation, constraint, and layout is complete. Layouts, animations, and constraints can occur over a specified period of time. During this time, view 120 still recognizes and responds to view changing events, which are detected in step 212.

Figure 6A:
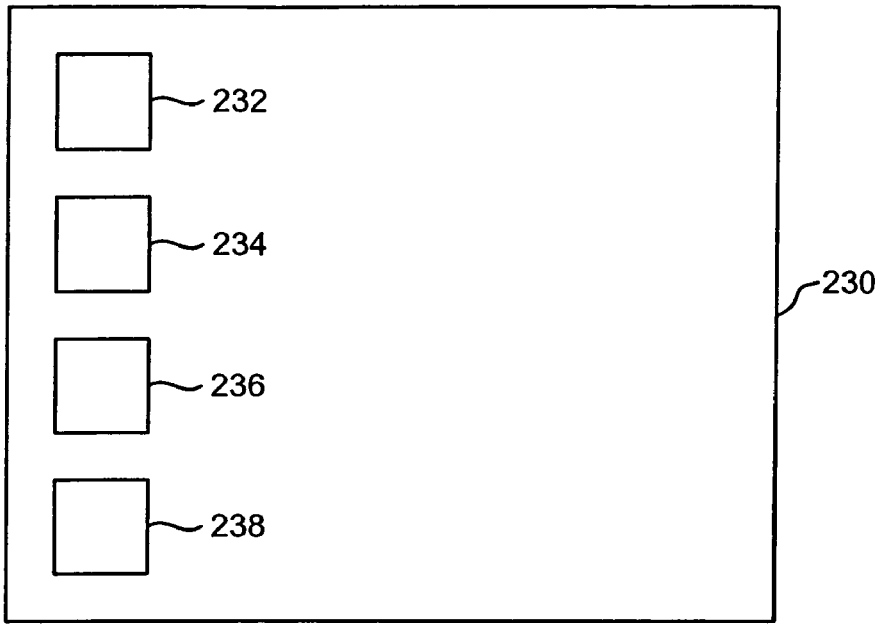
FIGS. 6A-6C show an exemplar animation of resources in a rendering area.
Figure 6B:
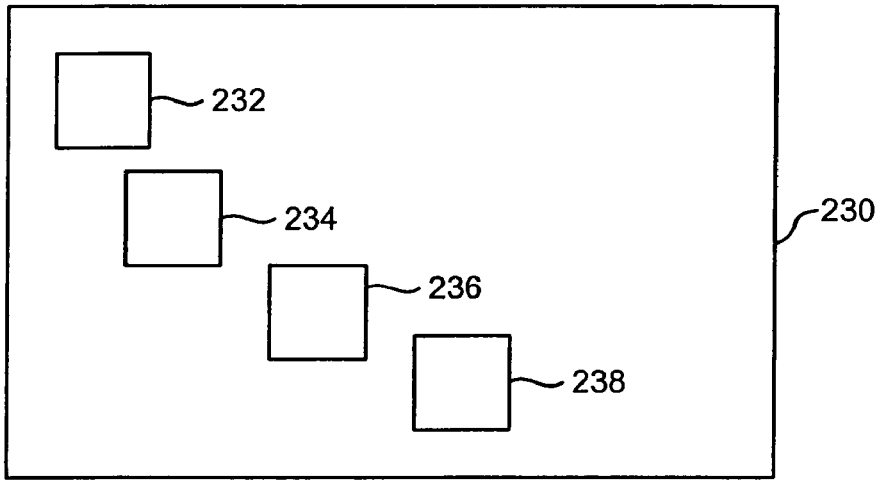
Figure 6C:
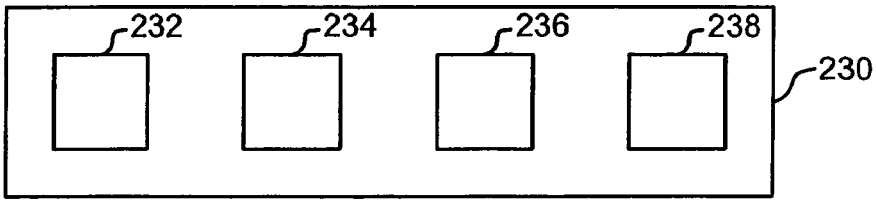

FIGS. 6A-6C show a view change that can be performed by interface engine 16 in accordance with the present invention. This change exemplifies the fluid transitions provided by interface engine 16. FIG. 6A shows view 230 with child views 232, 234, 236, and 238. An event calls for view 230 to be constricted with a horizontal child view arrangement, as shown in FIG. 6C. View 230 calls an animator to adjust its height and a layout to change the arrangement of child views 232, 234, 236, and 238. Interface engine 16 is able to continuously enhance view 230 by displaying many intermediate versions of view 230, such as the intermediate version shown in FIG. 6B. This enables interface engine 16 to make smooth transitions between view states.

As will be explained below, view 230 can set the period of time for an animator or layout to carry out changes in attribute values. This allows interface 16 to display many small changes to the height of view 230. This also allows small changes in child view layouts to be displayed. The layout responsible for arranging child views 232, 234, 236, and 238 calls animators to determine position changes for these child views over the same period of time that view height is animated. The called animators provide new position values for each child view along a path from the child view's position in FIG. 6A to the child view's position in FIG. 6C. The continuous position changes are displayed in a rendering area to provide the user with a fluid view of the layout change from FIG. 6A to FIG. 6C. FIG. 6B provides a snapshot of one such display.

Interface engine 16 obtains further enhancement from the independent operation of animators, as shown in FIG. 5. FIG. 5 shows a view employing multiple animators simultaneously (steps 206 and 208). The view is able to call a new animator whenever an event calls for animation, regardless of whether previously called animators have completed their animation. The view accumulates the animation from the newly called animators and previously called animators—making the view's intermediate displays reflect real-time effects of user inputs. In alternate embodiments, a view can dictate that a later called layout or animator override a previous layout or animator or be queued behind the previously called layout or animator.

Figure 7:
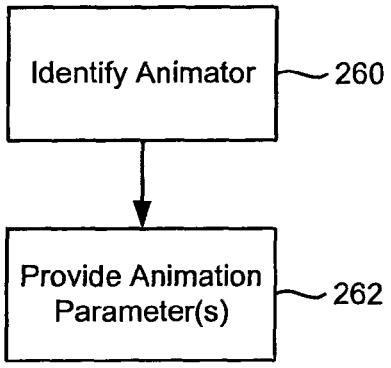
FIG. 7 shows one version of a sequence of operations carried out by an interface engine to call an animator.

FIG. 7 shows one implementation of a sequence of operations performed by a view when calling an animator (step 206, FIG. 5). The view identifies the animator (step 260) and provides the animator with parameters (step 262). In one embodiment, steps 260 and 262 are performed by a single function. In an alternate embodiment, steps 260 and 262 are performed separately.

In one implementation, the view provides parameters identifying the following: (1) prop—identifying a property to animate; (2) from—identifying the starting value for the property; (3) to—identifying the ending value for the property; (4) duration—identifying the duration of the property's animation; and (5) isRelative—indicating whether the called animator is applied to the property relatively. In alternate embodiments, an animator does not require all of these parameters or may include additional parameters. For example, one animator does not require the "from" parameter. As another example, a parameter specifies whether to accumulate the values from the called animator with other animators.

When an animator calls other animators in one embodiment, the view is required to provide parameters for the primary animator and the animators it calls. In alternate embodiments, this is not required.

Figure 8:
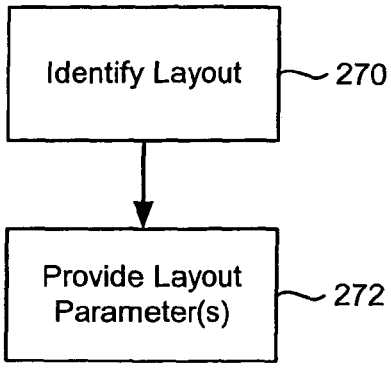
FIG. 8 depicts one version of a sequence of operations carried out by an interface engine to call a layout.

FIG. 8 shows one version of a sequence of operations performed by a view when calling a layout (step 202, FIG. 5). The view identifies the layout (step 270) and provides the layout with parameters (step 272). In one embodiment, steps 270 and 272 are performed by a single function. In an alternate embodiment, steps 270 and 272 are performed separately.

One example of a layout parameter includes an indicator of the child views to be effected by the layout. This can be achieved by listing the views to be laid out or the views to be ignored by the layout. Another example parameter is a layout duration time period—identifying the time a layout is to use in performing its adjustment of child view attributes. In alternate implementations, no parameters need to be supplied—eliminating the need for step 272.

The process for calling a constraint (step 210, FIG. 5) is essentially the same as shown in FIGS. 7 and 8 for calling animators and layouts. The difference is that the view employs the previously described constraint parameters.

Figure 9:
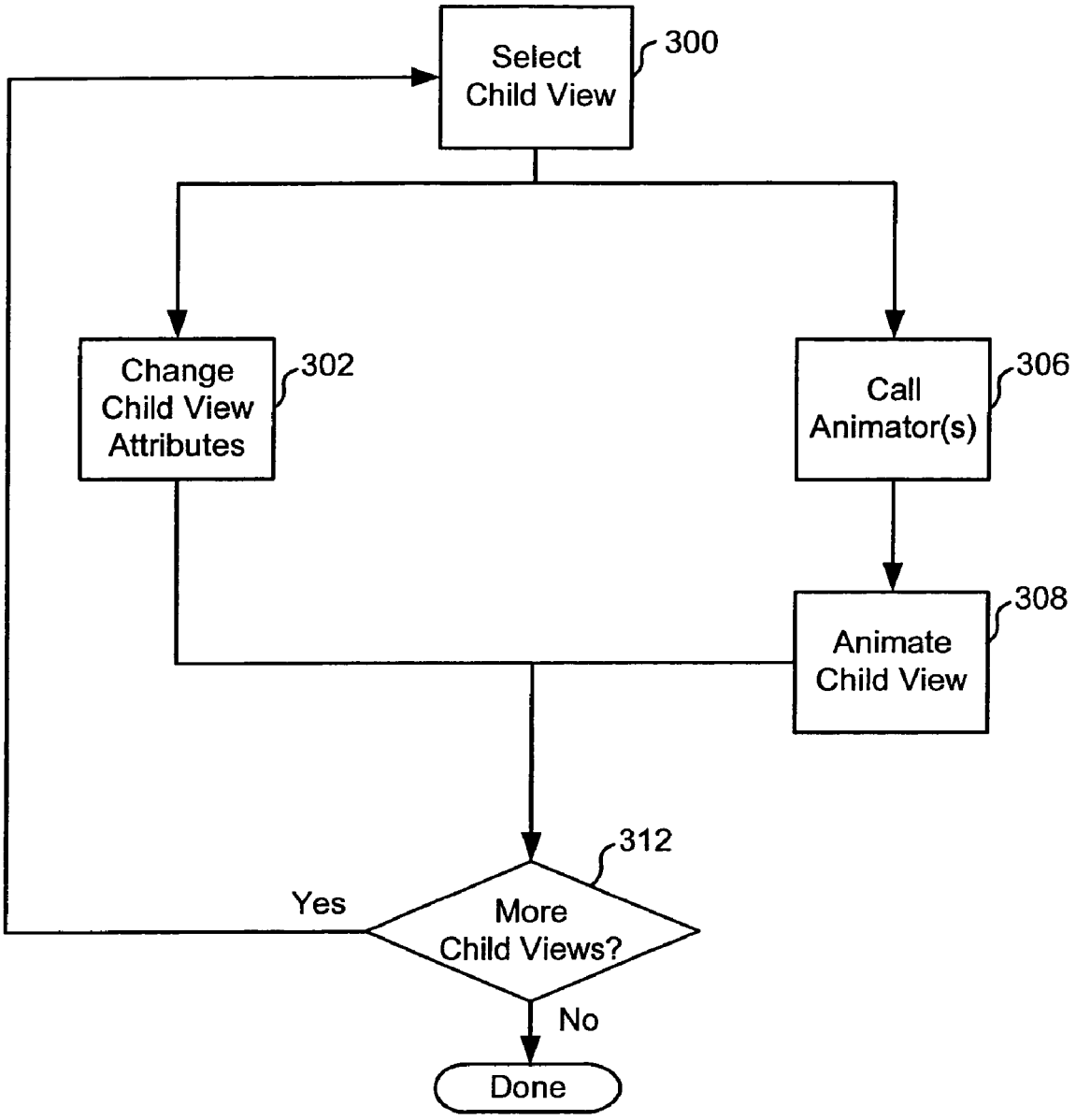
FIG. 9 illustrates one version of a sequence of operations carried out by an interface engine layout.

FIG. 9 shows a sequence of operation performed by a layout in one implementation of interface engine 16 to layout one or more child views (step 204, FIG. 5). The layout selects a child view (step 300) and changes the child view's attributes in accordance with the layout (step 302). For example, the layout may change the properties of the child view to modify its size and position. In some embodiments, the layout also calls one or more animators (step 306), as described above. The called animators animate the child view (step 308). In one embodiment, the animators provide new property values that the layout substitutes into the child view's property set.

After processing the child view, the layout determines whether any child views remain to be processed (step 312). If not, the layout is complete. Otherwise, the layout selects a new child view and repeats the above-described process shown in FIG. 9. As described above, multiple layouts can be in progress at the same time and layouts can make sets of continuous changes to child view attributes over a specified duration. The flow charts in FIGS. 5 and 9 show linear processes for the convenience of illustration. In operation, however, multiple layout operations can be in progress, with the process steps described in FIGS. 5 and 9 being performed.

Figure 10A:
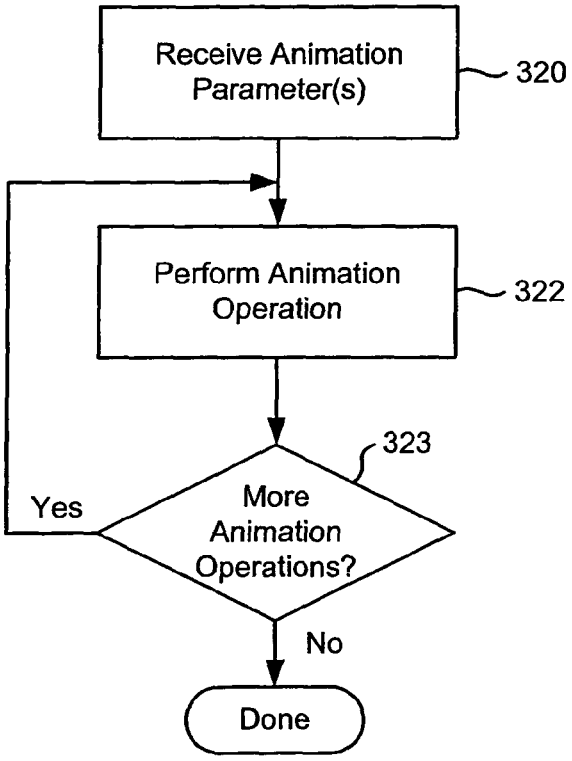
FIGS. 10A and 10B show one version a sequence of operations carried out by an interface engine animator.

FIG. 10A illustrates a sequence of operations performed by an animator in one embodiment of interface engine 16 to animate a view (step 208, FIG. 5 and step 308, FIG. 9). The called animator receives a set of animation parameters, as described above (step 320). The selected animator then performs an animation operation (step 322)—calculating a new property value and returning the new value. The view, layout, or animator that called the animator receives the new value. In the case of a view, in one embodiment, the new property value is added to or written over a present property value.

Figure 10B:
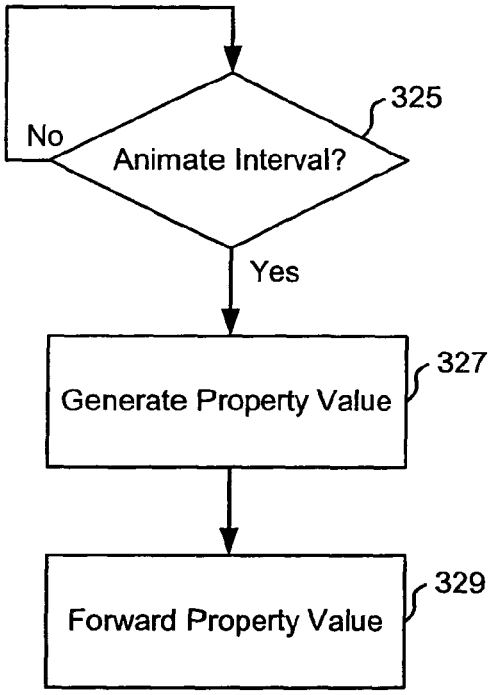

In one example, a view calls an animator to increase the view's height. The animator calculates an increment of the height increase and passes it back to the view, which incorporates the new value into the view's property set. The size of the increment is based on the animation duration appearing in the animation parameters and an animation interval of interface engine 16. FIG. 10B illustrates the effect of the animation interval, by showing the steps for performing animation (step 322) in one embodiment. The animator waits for a signal in interface engine 16 that an animation interval has expired (step 325)—indicating that the animator should provide the next property value. When the animator interval signal is detected, the animator generates the next property value (step 327) and forwards the value to the property's view (step 329).

The called animator determines whether more animation operations are required for the view (step 323, FIG. 10A). In one embodiment, the animator makes this determination by determining whether the end property value specified in the animation parameters has been reached. If the end value has not been reached, the above-described animation process from FIG. 10A is repeated. Otherwise, the animation is complete.

In one embodiment, a view receives values from many animators during the same time period. In one instance, the view receives values from multiple animators for the same property during overlapping time periods. As discussed above for the layout process, multiple sets of continuous property value changes can be received by a view and reflected in a display, during overlapping animation durations. This capability enables a continuous interface to fluidly adapt to interruptions in a current display transition. A user can introduce an event that causes a new animation to begin, even though a prior animation is not complete. Both animators co-exist—giving the rendering area display a fluid transition, instead of showing the user discrete screen snapshots. The ability of interface engine 16 to handle multiple layouts and constraints in parallel further enhances this benefit.

Figure 11:
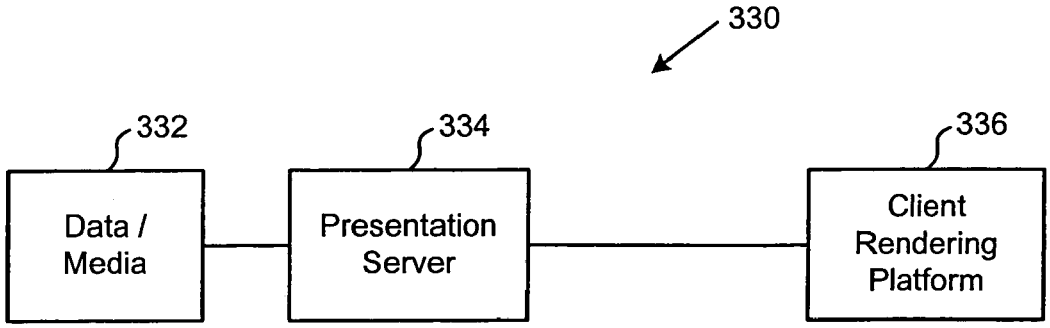
FIG. 11 depicts a block diagram for one implementation of a system for generating and executing an interface engine.

FIG. 11 shows one implementation of a system 330 for generating and executing interface engine 16. In system 330, presentation server 334 creates interface engine 16 by compiling an interface engine description (not shown) and specified data and media 332. Presentation server 334 then delivers the interface engine to client rendering platform 336, which includes a rendering environment and rendering area.

Figure 12:
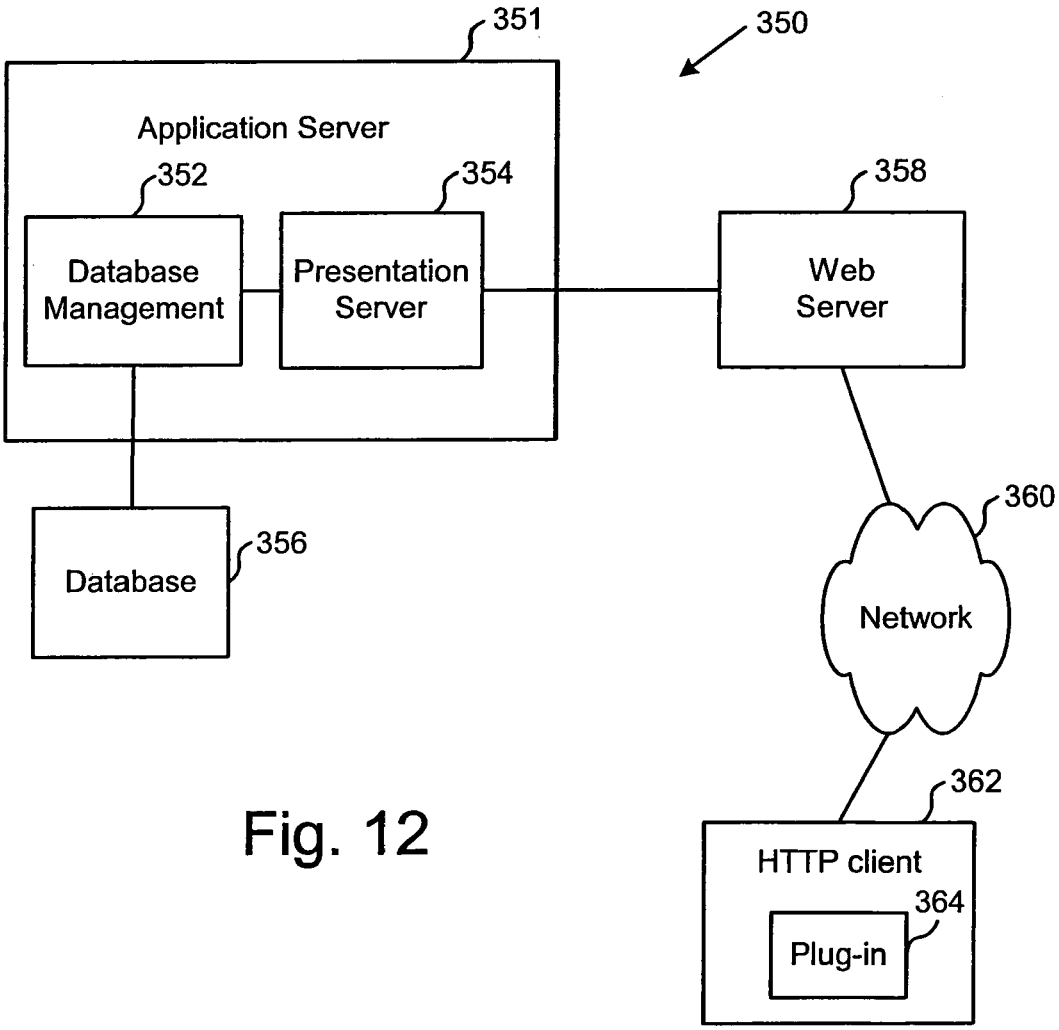
FIG. 12 shows a block diagram for one embodiment of a network-based system for generating and executing an interface engine.

FIG. 12 presents one embodiment of a network-based system 350 for generating and executing interface engine 16. Application server 351 supports presentation server 354 and database management system 352. In one embodiment, application server 351 hosts an Internet site that delivers content in the form of an interface engine in accordance with the present invention. Presentation server 354 is similar to presentation server 334, except presentation server 354 retrieves data and media from database 356 through database management system 352.

Presentation server 354 generates and delivers an interface engine in accordance with the present invention in response to a request from HTTP client 362. In one embodiment, HTTP client 362 and application server 351 communicate over network 360 through web server 358. Once the interface engine reaches HTTP client 362 it operates within plug-in 364. In one implementation, plug-in 354 provides a rendering environment, such as a Macromedia Flash Player environment.

Figure 13:
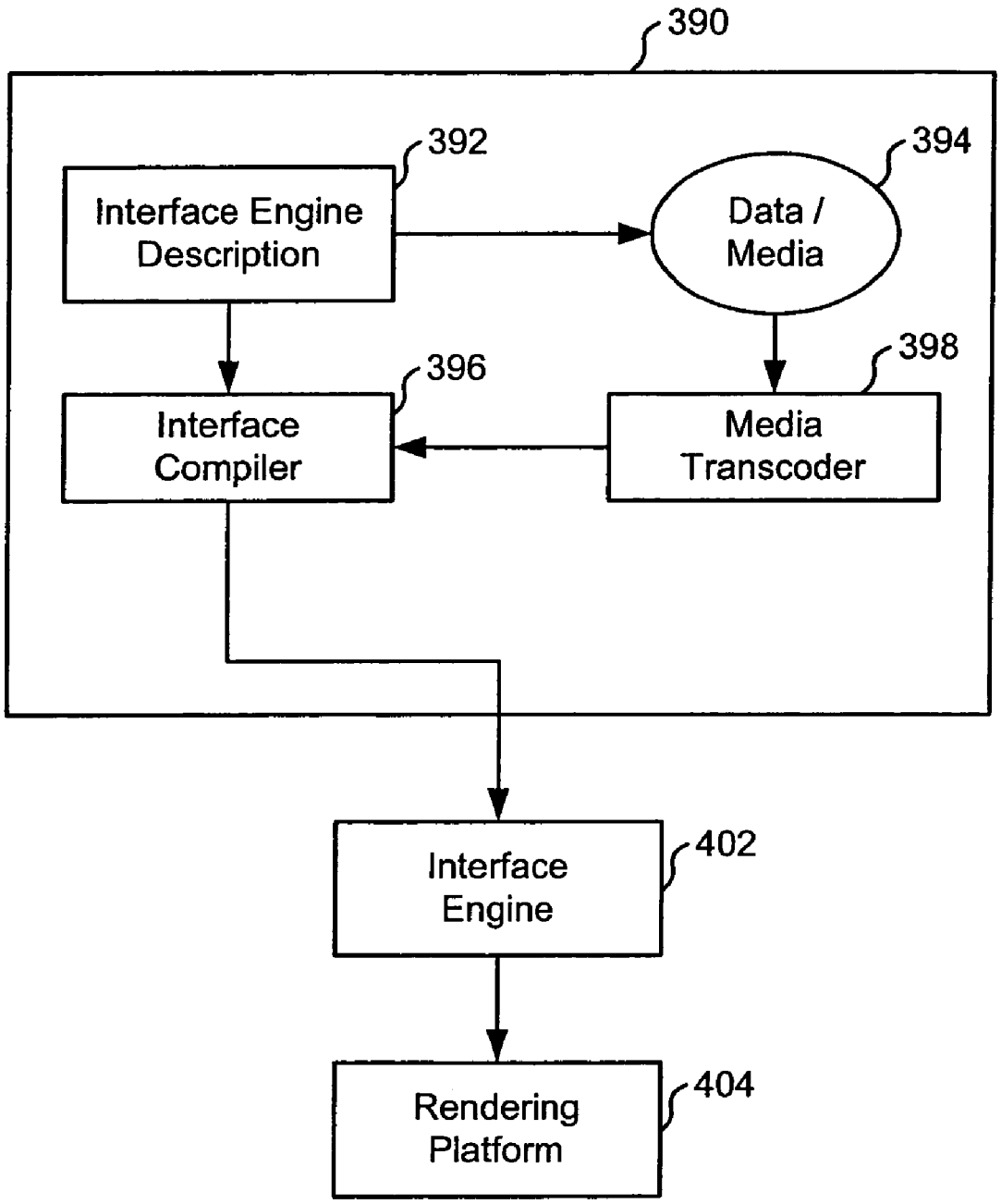
FIG. 13 shows one implementation of components for a presentation server.

FIG. 13 shows components in one implementation of a presentation server. Presentation server 390 includes interface engine description 392, which describes an interface engine in accordance with the present invention. Those skilled in the art will recognize that description 392 can be written in many different programming languages, including XML and other proprietary languages. Description 392 also specifies data and media 394 to be employed by the interface engine as resources.

Media transcoder 398 converts the specified data and media 394 into a format that can be incorporated into the interface engine. Interface compiler 396 combines the output of media transcoder 398 and description 392 and compiles them to generate interface engine 402. Presentation server 390 delivers interface engine 402 to rendering platform 404.

In one embodiment, interface compiler 396 generates interface engine 402 in the form of a .swf file for operation in a Marcomedia Flash Player rendering environment in platform 404. Those skilled in the art will recognize that many other rendering environments and file formats are suitable for embodiments of the present invention. Those skilled in the art also recognize that methods of compiling files into .swf formats for operation in a Flash Player are well known.

Figure 14:
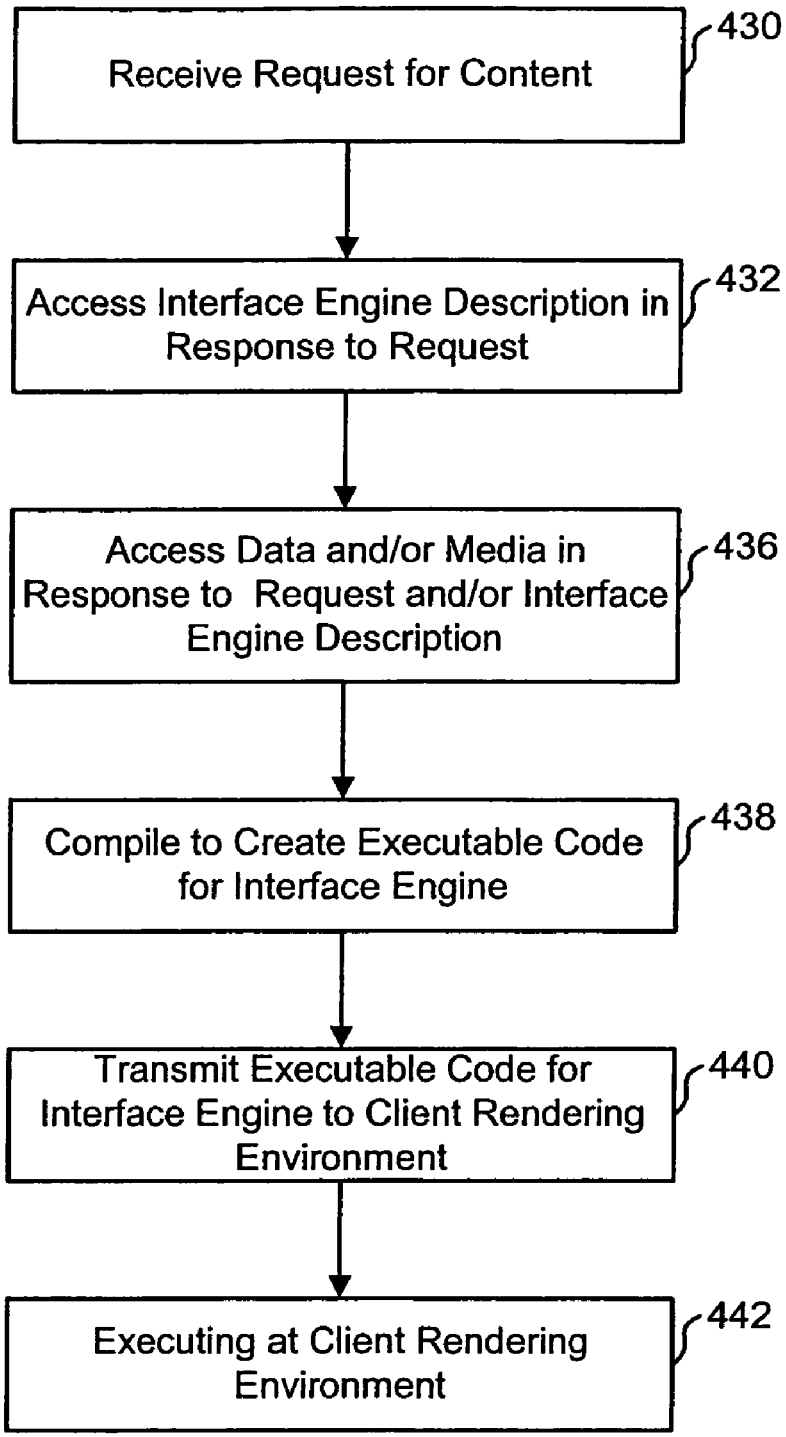
FIG. 14 illustrates one version of a sequence of operations performed to provide a resource environment with an interface engine.

FIG. 14 shows a sequence of operations performed by a presentation server 390 to provide an interface engine. Presentation server 390 receives a request for content from a rendering platform, such as HTTP client 362. In response to the request, presentation server 390 access interface engine description 392 (step 432). Presentation server 390 also accesses data and media 394 specified by description 392 and/or the rendering platform request (step 436).

Presentation server 390 compiles the description 392 and data and media 394 to create executable code for interface engine 402 (step 438). Presentation server 390 then transmits the executable code for interface engine 402 to a client rendering environment in rendering platform 404 (step 440). In one embodiment, this rendering environment is plug-in 364 in HTTP client 362 in FIG. 12. The rendering environment then executes the code for interface engine 402 (step 442).

Greater details regarding application servers, presentation servers, and their operation appear in U.S. patent application Ser. No. 10/092,010, entitled, "Presentation Server," and filed on the same day as the present application. This application is incorporated herein by reference.

Figure 15:
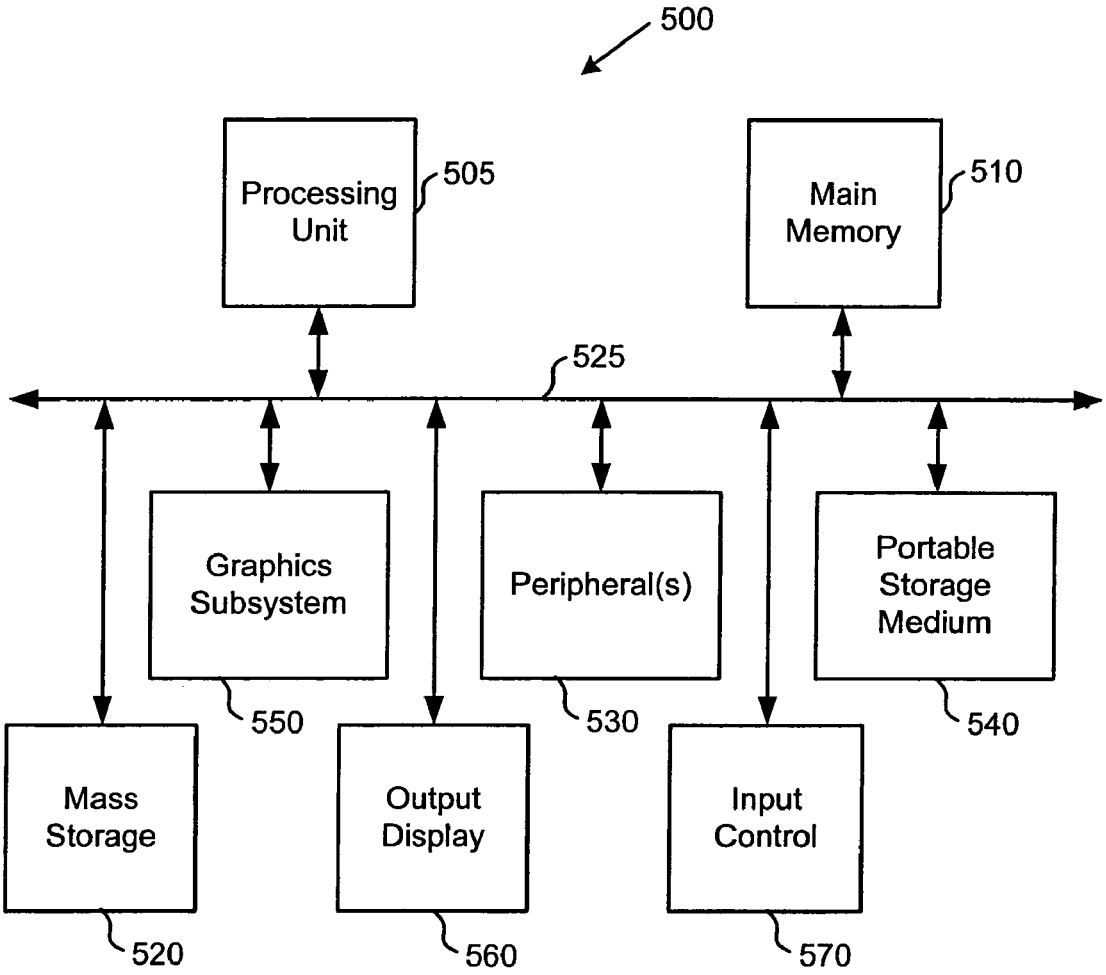
FIG. 15 shows a block diagram for one embodiment of components in a computing system that can be used to implement the present invention.

FIG. 15 illustrates a high level block diagram of general purpose computer system 500. System 500 may be employed in embodiments of the present invention to provide the functionality of a rendering environment and area, an interface engine, a presentation server, and an application server. Accordingly, computer system 500 may be employed for performing a number of processes, including those described above with reference to FIGS. 1-14.

Computer system 500 contains processing unit 505, main memory 510, and interconnect bus 525. Processing unit 505 may contain a single microprocessor or a plurality of microprocessors for configuring computer system 500 as a multiprocessor system. Processing unit 505 is employed in conjunction with a memory or other data storage medium containing application specific program code instructions to implement the functionality of a rendering environment and area, an interface engine, a presentation server, an application server, a view, or an attribute modifier.

Main memory 510 stores, in part, instructions and data for execution by processing unit 505. If a process, such as the processes described with reference to FIGS. 1-14, is wholly or partially implemented in software, main memory 510 can store the executable instructions for implementing the process when the computer is in operation. For example, main memory 510 can store program code instructions employed by a rendering environment and area, an interface engine, a presentation server, an application server, a view, and an attribute modifier. In one implementation, main memory 510 includes banks of dynamic random access memory (DRAM) as well as high speed cache memory.

In one implementation, computer system 500 further includes mass storage device 520, peripheral device(s) 530, portable storage medium drive(s) 540, input control device (s) 570, graphics subsystem 550, and output display 560. In alternate implementations, computer system 500 does not include all of the devices shown in FIG. 15.

For purposes of simplicity, all components in computer system 500 are shown in FIG. 15 as being connected via bus 525. However, computer system 500 may be connected through one or more data transport means in alternate implementations. For example, processing unit 505 and main memory 510 may be connected via a local microprocessor bus, and mass storage device 520, peripheral device (s) 530, portable storage medium drive(s) 540, and graphics sub-system 550 may be connected via one or more input/output busses.

Mass storage device 520 is a non-volatile storage device for storing data and instructions for use by processing unit 505. Mass storage device 520 can be implemented in a variety of ways, including a magnetic disk drive or an optical disk drive. In software embodiments of the present invention, mass storage device 520 stores the instructions executed by computer system 500 to perform processes such as those described with reference to FIGS. 1-14.

Portable storage medium drive 540 operates in conjunction with a portable non-volatile storage medium to input and output data and code to and from computer system 500. Examples of such storage mediums include floppy disks, compact disc read only memories (CD-ROM), memory sticks, and integrated circuit non-volatile memory adapters (i.e. PC-MCIA adapter). In one embodiment, the instructions for enabling computer system 500 to execute processes, such as those described with reference to FIGS. 1-14, are stored on such a portable medium, and are input to computer system 500 via portable storage medium drive 540.

Peripheral device(s) 530 may include any type of computer support device, such as an input/output interface, to add additional functionality to computer system 500. For example, peripheral device(s) 530 may include a communications controller, such as a network interface card or integrated circuit, for interfacing computer system 500 to a communications network or point-to-point links with other devices. Instructions for enabling computer system 500 to perform processes, such as those described with reference to FIGS. 1-14, may be downloaded into the computer system's main memory 510 over a communications network. Computer system 500 may also interface to a database management system over a communications network or other medium that is supported by peripheral device(s) 530.

Input control device(s) 570 provide a portion of the user interface for a user of computer system 500. Input control device(s) 570 may include an alphanumeric keypad for inputting alphanumeric and other key information, a cursor control device, such as a mouse, a trackball, stylus, or cursor direction keys. In order to display textual and graphical information, computer system 500 contains graphics subsystem 550 and output display 560. Output display 560 can include a cathode ray tube display or liquid crystal display. Graphics subsystem 550 receives textual and graphical information, and processes the information for output to output display 560.

The components contained in computer system 500 are those typically found in general purpose computer systems. In fact, these components are intended to represent a broad category of such computer components that are well known in the art.

The process steps and other functions described above with respect to embodiments of the present invention may be implemented as software instructions. More particularly, the process steps described with reference to FIGS. 1-14 may be implemented as software instructions. For one software implementation, the software includes a plurality of computer executable instructions for implementation on a general purpose computer system. Prior to loading into a general purpose computer system, the software instructions may reside as encoded information on a computer readable medium, such as a magnetic floppy disk, magnetic tape, and compact disc read only memory (CD—ROM). In one hardware implementation, circuits may be developed to perform the process steps and other functions described herein.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for providing an interface, comprising:

sending a request for network content from a network browser to a server via a network;

receiving an interface engine in response to said request, said interface engine including executable code having instructions to render a set of views in a user interface, each view having a set of attributes associated therewith, and instructions to modify each view through one or more attribute modifiers associated with each view, wherein said attribute modifiers include layouts, constraints and animators;

providing the user interface in said network browser using said interface engine;

receiving a request to change an appearance of at least one particular item of multiple items displayed in said user interface, wherein the one particular item is associated with a first view from the set of views; and in response to said request, changing the appearance of said one particular item in said user interface using said executable code of said interface engine to provide a continuous fluid transition of the appearance of said one particular item with a result that was not predetermined prior to said request, said continuous fluid transition is performed by calling said one or more attribute modifiers for said first view and modifying said first view in response to said one or more attribute modifiers.

2. A method according to claim 1, wherein:

said changing of appearances includes altering a property of a container in response to changing a property of another container.

3. A method according to claim 1, wherein:

said changing of appearances includes altering a position of one container in response to a different container expanding.

4. A method according to claim 1, wherein:

said changing appearances is performed by multiple animators.

5. A method according to claim 1, wherein:

said request to change appearances includes a request to change a position of a first item of said multiple items displayed in said user interface.

6. A method according to claim 1, wherein:

said request to change appearances includes a request to change a size of a first item of said multiple items displayed in said user interface.

7. A method according to claim 1, wherein:

said request to change includes a request to change an appearance of a first item with respect to other items of said multiple items displayed in said user interface; and said changing appearances includes changing said appearance of said first item with respect to said other items.

8. A method for providing an interface, comprising:

receiving content via a network;

displaying said content in a network browser, said displayed content includes a particular item, said displayed content provides a user interface;

receiving a request to change said particular item displayed in said network browser from a first visual state to a second visual state, said requested change was not predetermined prior to said request to change; and implementing said requested change by providing continuous fluid transitions for said particular item from said first visual state to said second visual state, said continuous fluid transitions are performed by a method comprising calling one or more attribute modifiers for said particular item and modifying said particular item in response to said one or more attribute modifiers, said attribute modifiers includes layouts, constraints and animators, said implementing said requested change includes making one or more changes to appearances of multiple items in a coordinated manner and showing intermediate steps of said changes to appearances of said multiple items, said multiple items includes said particular item.

9. A method according to claim 8, wherein:

said implementing said requested change includes altering a property of one container in response to changing a property of different container; and said multiple items includes said one container and said different container.

10. A method according to claim 8, wherein:

said changes are performed by multiple animators.

11. A method according to claim 8, wherein:

said request to change includes a request to change an appearance of said particular item with respect to other items of said multiple items displayed in said user interface.

12. A method according to claim 8, wherein:

said user interface comprises a set of user interface items that can be manipulated by a user, said user interface items include said particular item.

13. A method for providing an interface, comprising:

receiving content and an interface engine via a network, said interface engine including executable code having instructions to render a plurality of views in a display, each view having a plurality of attributes associated therewith, and instructions to modify each view through one or more attribute modifiers associated with each view, wherein said attribute modifiers include layouts, constraints and animators;

displaying said content in a network browser, said content includes a particular item, said particular item is associated with a first view of the plurality of views;

receiving a first request to change the appearance of said particular item displayed in said network browser from a first visual state to a second visual state;

implementing said first request to change by using the interface engine to provide a first set of continuous fluid transitions for said particular item from said first visual state toward said second visual state, said continuous fluid transitions being performed by calling said one of more attribute modifiers associated with the first view and modifying the appearance accordingly;

receiving a second request to change the appearance of said particular item during said first set of continuous fluid transitions;

interrupting said first set of continuous fluid transitions before completing said first set of continuous fluid transitions in response to said second request; and implementing said second request to change by using the interface engine to provide a second set of continuous fluid transitions for said particular item, said continuous fluid transitions being performed by calling said one or more attribute modifiers associated with the first view and modifying the appearance accordingly.

14. A method according to claim 13, wherein:

said content includes a user interface comprising a set of user interface items that can be manipulated by a user, said user interface items include said particular item.

15. A method for providing an interface, comprising:

receiving content and an interface engine via a network, said interface engine including executable code having instructions to render a plurality of views in a user interface, each view having a plurality of attributes associated therewith, and instructions to modify each view through one or more attribute modifiers associated with each view, wherein said attribute modifiers include layouts, constraints and animators;

displaying said content in a network browser, said content includes the user interface comprising a set of user interface items that can be manipulated by a user;

receiving a request to change a first user interface item of said set of user interface items, said first user interface item is associated with a first view of the plurality of views;

implementing said request to change by using the interface engine to provide continuous fluid transitions for said first user interface item from a first visual state to a second visual state, said continuous fluid transitions being performed by calling said one of more attribute modifiers associated with the first view and modifying the appearance accordingly; and changing one or more additional user interface items of said set of user interface items in response to said request to change said first user interface item, said implementing said requested change and said changing one or more additional user interface items includes using the interface engine to make one or more changes to appearances of said first user interface item and said one or more additional user interface items in a coordinated manner and showing intermediate steps of said changes to appearances of said first user interface item and said one or more additional user interface items.

16. A method according to claim 15, wherein:

said continuous fluid transitions for said first user interface item are performed by multiple animators.

17. One or more *non-transitory* processor readable storage devices having code embodied on said one or more processor readable storage devices, said code for programming one or more processors to perform a method comprising:

accessing an interface engine description; and compiling said interface engine description to create an interface engine, said user interface engine implements a user interface in a network browser, said user interface includes a set of interface items, said interface engine includes code to change a particular item displayed as part of said user interface from a first visual state to a second visual state and implements said change by providing continuous fluid transitions for said particular item from said first visual state to said second visual state, said continuous fluid transitions are performed by a method comprising calling one or more attribute modifiers for said particular item and modifying said particular item in response to said one or more attribute modifiers, said attribute modifiers includes layouts, constraints and animators, said implementing said change includes making one or more changes to appearances of multiple items in a coordinated manner and showing intermediate steps of said changes to appearances of said multiple items, said multiple items includes said particular item, and said changing of said particular item from said first visual state to said second visual state is not a predetermined change.

18. One or more *non-transitory* processor readable storage devices according to claim 17, wherein:

said implementing said requested change includes altering a property of one container in response to changing a property of different container; and said multiple items includes said one container and said different container.

*19. One or more non-transitory processor readable storage devices having code embodied on said one or more processor readable storage devices, said code for programming one or more processors to perform a method comprising:*

*sending a request for network content from a network browser to a server via a network;*

*receiving an interface engine in response to said request, said interface engine including executable code having instructions to render a set of views in a user interface, each view having a set of attributes associated therewith, and instructions to modify each view through one or more attribute modifiers associated with each view, wherein said attribute modifiers include layouts, constraints and animators;*

*providing the user interface in said network browser using said interface engine;*

*receiving a request to change an appearance of at least one particular item of multiple items displayed in said user interface, wherein the one particular item is associated with a first view from the set of views; and*

*in response to said request, changing the appearance of said one particular item in said user interface using said executable code of said interface engine to provide a continuous fluid transition of the appearance of said one particular item with a result that was not predetermined prior to said request, said continuous fluid transition is performed by calling said one or more attribute modifiers for said first view and modifying said first view in response to said one or more attribute modifiers.*

*20. One or more non-transitory processor readable storage devices according to claim 19, wherein:*

*said changing of appearances includes altering a property of a container in response to changing a property of another container.*

*21. One or more non-transitory processor readable storage devices according to claim 19, wherein:*

*said changing of appearances includes altering a position of one container in response to a different container expanding.*

*22. One or more non-transitory processor readable storage devices according to claim 19, wherein:*

*said changing appearances is performed by multiple animators.*

*23. One or more non-transitory processor readable storage devices according to claim 19, wherein:*

*said request to change appearances includes a request to change a position of a first item of said multiple items displayed in said user interface.*

*24. One or more non-transitory processor readable storage devices according to claim 19, wherein:*

*said request to change appearances includes a request to change a size of a first item of said multiple items displayed in said user interface.*

*25. One or more non-transitory processor readable storage devices according to claim 19, wherein:*

*said request to change includes a request to change an appearance of a first item with respect to other items of said multiple items displayed in said user interface; and*

*said changing appearances includes changing said appearance of said first item with respect to said other items.*

*26. One or more non-transitory processor readable storage devices having code embodied on said one or more processor readable storage devices, said code for programming one or more processors to perform a method comprising:*

*receiving content via a network;*

*displaying said content in a network browser, said displayed content includes a particular item, said displayed content provides a user interface;*

*receiving a request to change said particular item displayed in said network browser from a first visual state to a second visual state, said requested change was not predetermined prior to said request to change; and*

*implementing said requested change by providing continuous fluid transitions for said particular item from said first visual state to said second visual state, said continuous fluid transitions are performed by a method comprising calling one or more attribute modifiers for said particular item and modifying said particular item in response to said one or more attribute modifiers, said attribute modifiers includes layouts, constraints and animators, said implementing said requested change includes making one or more changes to appearances of multiple items in a coordinated manner and showing intermediate steps of said changes to appearances of said multiple items, said multiple items includes said particular item.*

*27. One or more non-transitory processor readable storage devices according to claim 26, wherein:*

*said implementing said requested change includes altering a property of one container in response to changing a property of different container; and*

*said multiple items includes said one container and said different container.*

*28. One or more non-transitory processor readable storage devices according to claim 26, wherein:*

*said changes are performed by multiple animators.*

*29. One or more non-transitory processor readable storage devices according to claim 26, wherein:*

*said request to change includes a request to change an appearance of said particular item with respect to other items of said multiple items displayed in said user interface.*

*30. One or more non-transitory processor readable storage devices according to claim 26, wherein:*

*said user interface comprises a set of user interface items that can be manipulated by a user, said user interface items include said particular item.*

*31. One or more non-transitory processor readable storage devices having code embodied on said one or more processor readable storage devices, said code for programming one or more processors to perform a method comprising:*

*receiving content and an interface engine via a network, said interface engine including executable code having instructions to render a plurality of views in a display, each view having a plurality of attributes associated therewith, and instructions to modify each view through one or more attribute modifiers associated with each view, wherein said attribute modifiers include layouts, constraints and animators;*

*displaying said content in a network browser, said content includes a particular item, said particular item is associated with a first view of the plurality of views;*

*receiving a first request to change the appearance of said particular item displayed in said network browser from a first visual state to a second visual state;*

*implementing said first request to change by using the interface engine to provide a first set of continuous fluid transitions for said particular item from said first visual state toward said second visual state, said continuous fluid transitions being performed by calling said one of more attribute modifiers associated with the first view and modifying the appearance accordingly;*

*receiving a second request to change the appearance of said particular item during said first set of continuous fluid transitions;*

*interrupting said first set of continuous fluid transitions before completing said first set of continuous fluid transitions in response to said second request; and*

*implementing said second request to change by using the interface engine to provide a second set of continuous fluid transitions for said particular item, said continuous fluid transitions being performed by calling said one or more attribute modifiers associated with the first view and modifying the appearance accordingly.*

*32. One or more non-transitory processor readable storage devices according to claim 31, wherein:*

*said content includes a user interface comprising a set of user interface items that can be manipulated by a user, said user interface items include said particular item.*

*33. One or more non-transitory processor readable storage devices having code embodied on said one or more processor readable storage devices, said code for programming one or more processors to perform a method comprising:*

*receiving content and an interface engine via a network, said interface engine including executable code having instructions to render a plurality of views in a user interface, each view having a plurality of attributes associated therewith, and instructions to modify each view through one or more attribute modifiers associated with each view, wherein said attribute modifiers include layouts, constraints and animators;*

*displaying said content in a network browser, said content includes the user interface comprising a set of user interface items that can be manipulated by a user;*

*receiving a request to change a first user interface item of said set of user interface items, said first user interface item is associated with a first view of the plurality of views;*

*implementing said request to change by using the interface engine to provide continuous fluid transitions for said first user interface item from a first visual state to a second visual state, said continuous fluid transitions being performed by calling said one of more attribute modifiers associated with the first view and modifying the appearance accordingly; and*

*changing one or more additional user interface items of said set of user interface items in response to said request to change said first user interface item, said implementing said requested change and said changing one or more additional user interface items includes using the interface engine to make one or more changes to appearances of said first user interface item and said one or more additional user interface items in a coor-*

*dinated manner and showing intermediate steps of said changes to appearances of said first user interface item and said one or more additional user interface items.*

*34. One or more non-transitory processor readable storage devices according to claim 33, wherein:*

*said continuous fluid transitions for said first user interface item are performed by multiple animators.*

*35. One or more non-transitory processor readable storage devices comprising framework code embodied on said one or more processor readable storage devices, said code for programming one or more processors to:*

*receive content via a network;*

*provide said received content for display by a network browser, said content for display to include a particular item, wherein said content for display is associated with a user interface;*

*receive a user request to change said particular item displayed in said network browser from a first visual state to a second visual state, said requested change was not predetermined prior to said request to change; and*

*implement said requested change by providing one or more continuous fluid transitions for said particular item from said first visual state to said second visual state, said implementing said requested change to include making one or more changes to appearances of multiple items in a coordinated manner and showing intermediate steps of said changes to appearances of said multiple items, said multiple items to include said particular item;*

*said framework code further to include code to perform said continuous fluid transitions, where the code to perform said continuous fluid transitions is to specify one or more attribute modifiers for said particular item to modify said particular item in response to said one or more attribute modifiers, said attribute modifiers to include layouts, constraints, and animators, the animators to specify modification of the appearance of the content for display over time, where the code to perform said continuous fluid transitions is to call said one or more attribute modifiers and to modify said particular item in response to the call of said one or more attribute modifiers.*

*36. The one or more non-transitory processor readable storage devices of claim 35, wherein the content is media content.*

*37. The one or more non-transitory processor readable storage devices of claim 35, wherein the content is streaming media content.*

*38. The one or more non-transitory processor readable storage devices of claim 35, wherein the content is video content.*

*39. The one or more non-transitory processor readable storage devices of claim 35, wherein the content is music content.*

*40. One or more non-transitory processor readable storage devices comprising code embodied on said one or more processor readable storage devices, said code for programming one or more processors to:*

*provide an interface engine with a modular architecture crafted to support continuous user interfaces to be displayed in a network browser;*

*said interface engine to provide for one or more continuous fluid transitions for a particular item of content from a first visual state to a second visual state based on a real time user input, said continuous fluid transition to include making one or more changes to appearances of multiple items in a coordinated manner and showing intermediate steps of said changes to appearances of said multiple items, said multiple items to include said particular item, where said one or more changes were not predetermined prior to said real time user input;*

*said interface engine further to include code to perform said continuous fluid transitions, where the code to perform said continuous fluid transitions is to provide one or more attribute modifiers and is to modify said particular item in response to one or more values associated with said one or more attribute modifiers, said attribute modifiers to include layouts, constraints, and animators, the animators to specify modification of the appearance of the displayed content over time, where the code to perform said continuous fluid transitions is to call said one or more attribute modifiers and to modify said particular item in response to the call of said one or more attribute modifiers.*

*41. The one or more non-transitory processor readable storage devices of claim 40, wherein the particular item of content is media content.*

*42. The one or more non-transitory processor readable storage devices of claim 40, wherein the particular item of content is streaming media content.*

*43. The one or more non-transitory processor readable storage devices of claim 40, wherein the particular item of content is video content.*

*44. The one or more non-transitory processor readable storage devices of claim 40, wherein the particular item of content is music content.*

* * * * *